United States Patent
Tausch et al.

[19]

[11] Patent Number: 6,078,713
[45] Date of Patent: Jun. 20, 2000

[54] BEAM DELIVERY SYSTEM FOR CURING OF PHOTO INITIATED INKS

[75] Inventors: Mark J. Tausch, West Chester; Larry R. Dosser, Centerville; Carl J. Kershner, Dayton, all of Ohio

[73] Assignee: UV Technology, Inc., Cincinnati, Ohio

[21] Appl. No.: 09/093,442

[22] Filed: Jun. 8, 1998

Related U.S. Application Data

[60] Provisional application No. 60/053,500, Jul. 23, 1997.

[51] Int. Cl.[7] ........................................ G02B 6/04
[52] U.S. Cl. .......................................... 385/115; 101/416.1
[58] Field of Search .................................. 385/115, 147; 101/416.1, 424.1; 118/DIG. 1

[56] References Cited

U.S. PATENT DOCUMENTS

| | | |
|---|---|---|
| 3,506,779 | 4/1970 | Brown et al. . |
| 3,787,873 | 1/1974 | Sato et al. . |
| 4,271,258 | 6/1981 | Watariguchi . |
| 4,460,676 | 7/1984 | Fabel . |
| 4,626,493 | 12/1986 | Butters et al. . |
| 4,769,310 | 9/1988 | Gugger et al. . |
| 4,991,506 | 2/1991 | Rodi ..................................... 101/416.1 |
| 5,030,551 | 7/1991 | Herren et al. . |
| 5,115,741 | 5/1992 | Rodi ..................................... 101/424.1 |
| 5,153,106 | 10/1992 | Liu . |
| 5,198,321 | 3/1993 | Hosoi et al. . |
| 5,220,346 | 6/1993 | Carreira et al. . |
| 5,259,311 | 11/1993 | McCaughey, Jr. . |
| 5,270,368 | 12/1993 | Lent et al. . |
| 5,278,027 | 1/1994 | Clarke . |
| 5,296,275 | 3/1994 | Goman et al. . |
| 5,312,654 | 5/1994 | Arimatsu et al. . |
| 5,322,762 | 6/1994 | Kushi et al. . |
| 5,325,781 | 7/1994 | Dupont et al. . |
| 5,328,811 | 7/1994 | Brestel . |
| 5,346,802 | 9/1994 | Ohbachi et al. . |
| 5,405,968 | 4/1995 | Albert et al. . |
| 5,442,482 | 8/1995 | Johnson et al. . |
| 5,445,923 | 8/1995 | Takahashi et al. . |
| 5,453,340 | 9/1995 | Kawabata et al. . |
| 5,501,944 | 3/1996 | Hill et al. . |
| 5,503,956 | 4/1996 | Kaszczuk et al. . |
| 5,511,477 | 4/1996 | Adler et al. . |
| 5,521,050 | 5/1996 | Henzel et al. . |
| 5,529,884 | 6/1996 | Tutt et al. . |

FOREIGN PATENT DOCUMENTS

0202803A2  11/1986  European Pat. Off. .

OTHER PUBLICATIONS

John P. Wheeler, *Light–Emitting Polymers Are Ready for Prime Time*, Photonics Spectra, Apr. 1997, pp. 130–134.

*Primary Examiner*—Akm E. Ullah
*Attorney, Agent, or Firm*—Wood, Herron & Evans, L.L.P.

[57] ABSTRACT

A light source such as a laser generates light of a specific wavelength which is transmitted through a bundle of fiber optic cables to project light onto a moving web having ink, dye or another coating including a photo initiator therein. The cables are arranged in a pattern to project a light onto the moving web and thereby expose the ink to the light to initiate photo polymerization of the ink on the moving web. Advantageously, the beam delivery system avoids the need for scanning of the laser light across the width of the web which in many applications minimizes the speed at which the web can be operated.

33 Claims, 1 Drawing Sheet

BEAM DELIVERY SYSTEM FOR CURING OF PHOTO INITIATED INKS

This claims the benefit of U.S. Provisional Application Ser. No. 60/053,500, filed Jul. 23, 1997.

BACKGROUND OF THE INVENTION

The present invention relates to the curing of coatings and inks, and more particularly, to a light delivery system for curing of photo initiated coatings and inks.

Clear or pigmented coatings and inks are typically used in the printing and painting industries. In one particular application in the printing industry, a web of cellulosic and synthetic material such as paper or the like is printed with ink. Commonly, the ink includes a photo initiator which is responsive to a particular wavelength of light. The photo initiator initiates the curing process of the ink when the ink is exposed to an appropriate wavelength of light. Such a process is commonly known as photo polymerization. Typically, the wavelength associated with the photo initiator is in the ultraviolet range. Photo initiators have become common in the printing industry and in many applications have replaced water and solvent based inks, varnishes and coatings all of which give off volatile organic compounds during the drying process.

It is known in the printing industry to use a medium pressure mercury arc lamp or the like for the curing of the ink or other polymer containing a photo initiator. These lamps generate surface temperatures as much as 750° C. or greater. Additionally, only about 25% of the light emitted from these lamps is usable light in the photo polymerization process. The remaining light is emitted in the form of heat, white light or the like. The tremendous heat generated by the mercury arc lamps has proven detrimental to the printing process because it may damage the printing web and require a cooling system such as a forced air cooling system. Chill drums and methods of cold curing have been used to combat the undesirable effects of the heat generated by the mercury arc lamps. Unfortunately, these methods are expensive.

An additional disadvantage of mercury arc lamps in these applications is that the lamps emit light at wavelengths at less than 300 nanometers (nm) which in turn generate ozone that is disbursed to the atmosphere through the forced air cooling system or other ventilation apparatus.

One alternative to the mercury arc lamps that has been proposed is the use of wave length specific light to initiate the photo polymerization process in the printing industry or other applications. The advantages of wave length specific light for the photo polymerization process include the ability to precisely deliver the wavelength of light that activates a particular photo initiator without requiring the excess heat or energy generated by typical mercury arc lamps. As a result, excess or unused light is not generated and the excessive heat associated with the use of mercury arc lamps is thereby avoided. As a result, chill drums or other cooling devices are typically not required with the use of wave length specific light. Additionally, wave length specific light sources such as lasers or the like do not lead to the generation of environmental contaminates such as volatile organic compounds and ozone.

However, limitations on the use of wave length specific laser light to initiate the photo polymerization of inks on a moving web include the inability to accurately deliver the laser light with sufficient power to the moving web. To effectively activate the photo initiator in the inks requires a minimum amount of energy to be delivered to the ink at the specific wavelength. Past systems which use a wave length specific laser light source for curing photo initiator inks project the light directly from the laser or other light source onto the moving web in a pulsed or continuous (CW) operation. One such application is disclosed in European patent application Ser. No. 202,803 published Nov. 26, 1986, the disclosure of which is hereby incorporated by reference. Another known method for directing the laser light onto the moving web is to scan the laser light beam across the width of the moving web.

Commonly, the print web containing the inks and dyes moves at speeds as great as 2,000 feet per minute or more and the web is typically at least 1.0" in width. To achieve the required dwell time of the laser light on the inks to produce a sufficient amount of energy to initiate the photo polymerization process severely limits the speed of the moving web. Additionally, the combinations of scanning the laser light source across the width of the web in order to expose the entire web to the light source and/or pulsing the laser light source onto the web further limits the speed of the web.

As a result, even though laser light for curing photo initiator inks minimizes the heat generated in the process and any resulting damage to the web as a result of the heat while eliminating the need for chill drums or other cooling devices, the production capability of the printing system is limited as a result of restrictions on the speed of the moving web to achieve adequate dwell time and energy delivered to the ink.

SUMMARY OF THE INVENTION

It has therefore been a primary objective of this invention to provide a system for delivering light of the specific wavelength required to initiate photo polymerization of inks, dyes, varnishes or the like without generating excessive heat and thereby eliminating the need for cooling devices as in known systems.

It has been a further objective to provide such a system that does not release volatile organic compounds, ozone or other contaminates into the atmosphere during the curing process.

It has been a still further objective to provide such a system which utilizes a wave length specific light source such as a laser.

It has been a still further objective to provide such a system without reducing the speed of the moving web and thereby limiting the printing production process.

These and other objectives of the invention have been attained by a system for curing ink or other coatings on a moving web in which the ink includes a photo initiator responsive to a light source having a specified wavelength, preferably between 190 nanometers (nm) and 1,100 nm. In a presently preferred embodiment of the invention, the light can be generated by a tuneable laser, LED or other monochromatic light source, to selectively generate the light having a specified wavelength appropriate to initiate the photo polymerization process in the ink, dye or other coating on the moving web. The light is delivered to the moving web though a bundle of individual fiber optic cables which are preferably fused silica or natural quartz. A first end of each of the fiber optic cables is connected to the light source. A second end of each of the cables is spaced a fixed distance from the surface of the moving web on which the ink or other coating has been applied. The ends of the fiber optic cables are arranged in a pattern to project the light onto the moving web.

In one preferred embodiment, the ends of the fiber optic cables which project the light onto the moving web are arranged in a generally linear or straight line pattern which extends perpendicularly to the direction of travel of the moving web substantially the entire width of the moving web or at least a portion of the moving web onto which the ink or other coating has been applied. As a result of the beam delivery system according to the present invention, the light of the specified wavelength to initiate photo polymerization is delivered to the inks without the need for pulsing or scanning the light across the width of the web. Although it will be appreciated that in certain applications pulsing of the light may be performed within the scope of the present invention. Additionally, sufficient energy to activate the photo initiator in the inks is delivered through the fiber optic cables without damage to the cables themselves or slowing the speed of the moving web in order to increase the dwell time of the light onto the inks as is required with prior systems.

A preferably quartz protective window is positioned between the ends of the fiber optic cables and the moving web to protect the fiber optic cables from inks or other contaminates which may splatter off of the moving web prior to curing and foul the fiber optic delivery system. The protective window in certain applications may be a disposable item or periodically removed for cleaning and replaced so as to avoid the need for a technician or operator of the system to clean the ends of the fiber optic cables.

In a first presently preferred embodiment of this invention, the fiber optic cables are arranged in a linear or straight line across the width of the moving web and are each spaced a fixed distance from the moving web. The moving web is supported by a generally planar substrate as it passes beneath the fiber optic cables. In an alternative preferred embodiment, the moving web is supported by a cylindrical drum such as a central impression web as is well known by one of ordinary skill in the art. In this instance, the protective window is curved to conform to the profile of the web. The profile of the ends of the fiber optic cables may be curved, flat or profiled so that each cable is positioned a set distance away from the web and the ends are preferably all an equal distance from the web, although other arrangements are possible according to this invention.

Additionally, another preferred embodiment of the present invention is an arrangement of fiber optic cables having a plurality of linear rows of cables forming a grid or similar pattern to increase the dwell time of the light onto the web as may be required in certain applications without decreasing the speed of the moving web.

A still further alternative preferred embodiment of the beam delivery system according to this invention is to include a number of monochromatic light sources each of which have a bundle of fiber optic cables connected thereto. The ends of all the fiber optic cables are then arranged in a specific pattern so that each light source can be tuned to a particular wavelength which may or may not be the same as the wavelength of the other light sources in order to cure a portion of the web which includes the ink having the appropriate photo initiator on that portion of the web.

As a result of the beam delivery system of this invention, the photo polymerization of inks or other coatings on a moving web can be easily and efficiently accomplished with the laser, LED or other wave length specific light source without detrimentally effecting the speed of the web, generating excess heat, damaging the web or releasing volatile organic chemicals and ozone into the atmosphere.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
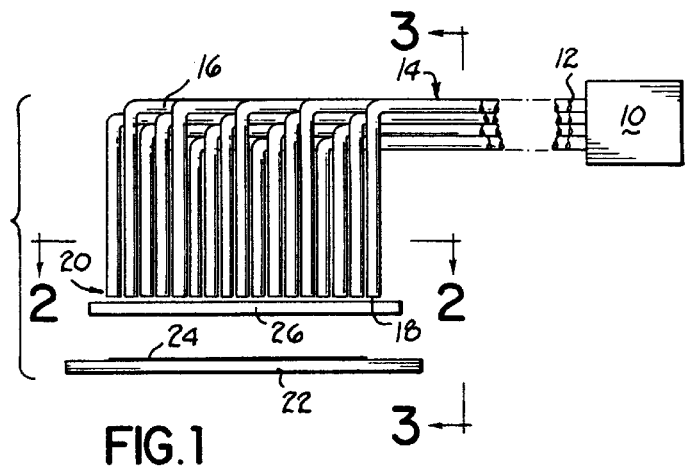
FIG. 1 is a schematic view of a first presently preferred embodiment of a beam delivery system for light generated from a light source and delivered to a moving web through a bundle of fiber optic cables which are separated from the web by a protective window.
Figure 3:
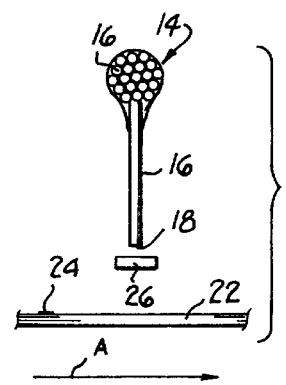
FIG. 3 is a cross-sectional view taken along line 3—3 of FIG. 1.
Figure 2:
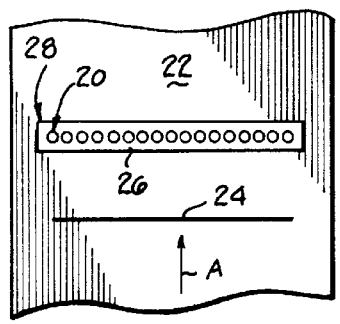
FIG. 2 is a cross-sectional view taken along line 2—2 of FIG. 1 showing the light projection onto the moving web.

Referring to FIGS. 1–3, a first presently preferred embodiment of this invention is shown and includes a wave length specific or monochromatic light source 10 connected to a first end 12 of a bundle 14 of fiber optic cables 16. A second end 18 of each of the fiber optic cables 16 in the bundle 14 is arranged into a pattern 20 and positioned a fixed distance away from a moving web 22 of material such as paper or the like. The web 22 includes ink, dye, material or another coating 24 applied to an upper surface of the web. Preferably, the coating or material 24 includes a photo initiator which upon activation by light of a specified wavelength initiates photo polymerization for curing of the ink, coating 24 or the like as is well known by one of ordinary skill in the art.

Preferably, a protective window 26 is positioned between the second end 18 of the fiber optic cables 16 and the moving web 22. The protective window 26 inhibits the ink 24 or other foreign matter from splattering onto the fiber optic cables 16 and fouling the delivery of the light to the moving web 22. The light cures the ink 24 into a polymer which will attenuate and eventually block the light if it is allowed to accumulate on the fiber optic cables 16 or the protective window 26. The protective window 26 is provided to protect the ends 18 and may be cleaned by the press operator or replaced as required.

Preferably, the second end 18 of the fiber optic cables 16 of the bundle 14 are arranged in the pattern 20 such as a linear or generally straight line which extends substantially across the entire width of the web 22 and is oriented perpendicularly to the direction of travel of the web as indicated by arrow A in FIGS. 2 and 3. The light generated by the light source 10 is delivered through the fiber optic cables 16 to form a projection 28 of the light from the second ends 18 of the fiber optic cables 16 onto the web 22. Advantageously, the projection 28 of the light from the source 10 through the fiber optic cables 16 is fixed and extends substantially across the width of the moving web 22, or at least the portion of the web 22 having the coating 24 thereon, so that scanning of the light across the width of the web 22 is not required in order to expose the web 22 and all of the ink 24 thereon to the light. As a result, the present invention can be practiced without diminishing the speed of the moving web 22 which is preferably up to 2,000 feet per minute or greater.

In a presently preferred embodiment of the invention, the light source 10 is a tunable solid state laser capable of operating in a pulsed or a non-pulsed mode. One such type of laser is a Ti:Sapphire laser. The specifications of appropriate lasers for the practice of this invention are described and identified in the 1996 *Laser Focus World Buyer's Guide*, the disclosure of which is hereby incorporated by reference in its entirety. Specific lasers are identified on pgs. 47–180. However, it will be appreciated by one of ordinary skill in the art that any light source capable of producing light of the appropriate wavelength such as a solid state laser, gas dynamic laser, other types of lasers, LED or other monochromatic light source are well within the scope of this invention.

Preferably, the fiber optic cables 16 are capable of carrying light having a wavelength ranging from 190 nm to about 1,100 nm. Additionally, the thickness of the fiber optic cables is preferably in the range of about 10 microns and about 2 mm and most preferably the thicknesses is application driven and selected accordingly. Depending upon the wavelength of light generated by the light source 10 for initiating the photo polymerization process of the ink 24, the fiber optic cables 16 may be fused silica or natural quartz having a refractive index as indicated in the following table:

| Wavelength | Fused Silica Refractive Index | Natural Quartz Refractive Index |
| --- | --- | --- |
| 190 nm | 1.56572 | |
| 193 | 1.56077 | 1.56071 |
| 200 | 1.55051 | |
| 248 | 1.50855 | |
| 250 | 1.50745 | 1.50762 |
| 266 | 1.49968 | |
| 300 | 1.48779 | |
| 308 | 1.48564 | |
| 325 | 1.48164 | |
| 355 | 1.47607 | |
| 400 | 1.47012 | 1.47025 |
| 441.6 | 1.46622 | |
| 450 | 1.46557 | 1.46568 |
| 488 | 1.46301 | 1.46315 |
| 500 | 1.46233 | 1.46243 |
| 514.5 | 1.46156 | 1.46181 |
| 532 | 1.46071 | |
| 550 | 1.45991 | 1.46001 |
| 600 | 1.45804 | 1.45814 |
| 632.8 | 1.45702 | 1.45718 |
| 650 | 1.45653 | 1.45663 |
| 700 | 1.45529 | 1.45539 |
| 750 | 1.45424 | 1.45433 |
| 800 | 1.45332 | 1.45341 |
| 850 | 1.45250 | 1.45259 |
| 900 | 1.45175 | 1.45185 |
| 1,000 | 1.45042 | 1.45051 |
| 1064 | 1.44963 | 1.44975 |
| 1100 | 1.44920 | 1.44930 |

One particular advantage of the beam delivery system according to this invention is the ability to avoid solarization of the fiber optic cables 16 which is particularly common while transmitting light below 240 nm. The ability to disburse the light across the width of the moving web 22 with a plurality of fiber optic cables 16 reduces the need for increased energy or power transmission through any individual cable 16 which avoids vitrification or solarization and damage to the optical fiber 16.

Preferably, the second ends 18 of the fiber optic cables 16 are in very close proximity to the upper surface of the protective window 26 and more preferably spaced approximately 0.001". The protective window 26 is preferably made from one of several materials that are very transparent to the relevant wavelengths of laser light. Most preferably, quartz at a thickness from 0.1 mm to 3 mm may be used for the protective window 26.

The protective window 26 is preferably spaced and generally parallel to the upper surface of the moving web 22 and more preferably it is within approximately 0.005" from the web 22.

The particular inks 24 which can be used in the printing process and with the fiber optic delivery system according to this invention include a photo initiator as is well known by one of ordinary skill in the art. Inks of this type are commercially available from the Sun Chemical Corporation, Inc. and examples of such inks which have been tested and cured with UV laser light at a wavelength of 355 nm include Sun Chemical Corporation, Inc.'s R2632-77-1; R2603-123-6; 10-HF-20; CRD40516R/F; and CRF47374F/R. The inks were determined to be cured after a standard rub test was performed. The previously identified inks in addition to Sun Chemical Corporation, Inc.'s R2632-77-1 and CRD10527R/F were likewise cured with a UV laser light source at wavelength of 266 nm. Additionally, all of the previously identified inks along with R263-123-6 were cured with a wavelength of 248 nm. It should be understood by one of ordinary skill in the art that the above-identified inks are exemplary and the present invention is not limited in scope or application to these particular ink compositions. Furthermore, inks or coatings which may have a selectable photo initiator which respond to a specific wavelength or range of wavelengths can be cured with this invention.

Referring to FIG. 3, the bundle 14 of fiber optic cables 16 is arranged into a generally straight line or linear arrangement for projection of the light though the protective window 26 and onto the moving web 22. The straight line pattern 20 of the fiber optic cables 16 proximate the second end 18 thereof is generally perpendicular to the direction of movement of the web 22 and produces a projection 28 of laser light extending substantially the entire width of the web 22 and/or covering the entire ink pattern 24 on the web 22 as shown in FIG. 2.

Figure 4:
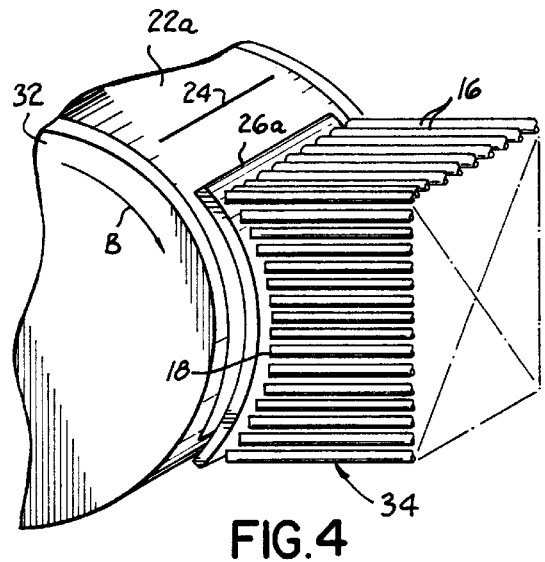
FIG. 4 is a second present by preferred embodiment of the present invention showing a pattern of fiber optic cables for delivering light through a protective window onto a web supported on a rotating central impression drum.

A second presently preferred embodiment of a beam delivery system according to this invention is shown in FIG. 4. The moving web 22a is supported by a generally cylindrical rotating substrate 32 known in the printing industry as a central impression web. The ink, dye or other coating 24 having a photo initiator is applied to the web 22a for rotation on the central impression web 32. In specific printing applications, it may be desirable to increase the dwell time of the light on the web and for this and other purposes, an array 34 of fiber optic cables 16 is positioned such that a second end 18 of each of the cables 16 is located a fixed distance away from the moving web 22a.

Preferably, as shown in FIG. 4, the fiber optic cables 16 are arranged in a series of generally equally spaced linear rows extending across the width of the web 22a generally perpendicular to the direction of travel (arrow B) of the web 22a. A first end (not shown in FIG. 4) of the cables is connected to a monochromatic or wave length specific light source (not shown in FIG. 4), preferably of the type previously described with reference to the first presently preferred embodiment of FIGS. 1–3.

Once again, a protective window 26a of transparent material, preferably quartz, is positioned between the fiber optic cables 16 and the web 22a to inhibit slinging or splattering of ink 24 or other foreign contaminates onto the fiber optic cables 16. Preferably, as shown in FIG. 4, the protective window 26a is curved, generally parallel to the upper surface of the web 22a and spaced approximately 0.005" from the web 22a and approximately 0.001" from the fiber optic cables 16. The protective window 26a is intended to be cleaned or removed and replaced by a technician operating the printing system at appropriate times to maintain the transmission of the light through the window 26a. It can be appreciated that other arrangements of fiber optic cables may be provided other than those shown herein.

Figure 5:
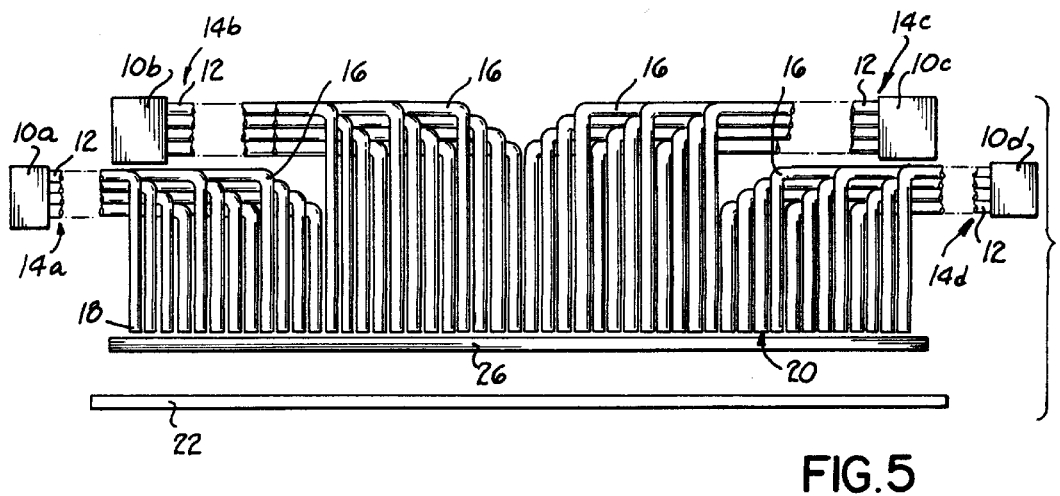
FIG. 5 is a third presently preferred embodiment of this invention showing multiple light sources each connected to a bundle of individual fiber optic cables which are all arranged to form a pattern and project light through a protective window onto a moving web having ink or other coatings including photo initiators thereon.

A third presently preferred embodiment of this invention is shown in FIG. 5 and includes a number of monochromatic or wave length specific light sources 10a, 10b, 10c, 10d, four of which are shown in FIG. 5 as an example. Once again, each of the light sources are preferably solid state tunable lasers or the like as previously described. A bundle 14a, 14b, 14c, 14d of fiber optic cables 16 is connected to each of the light sources 10a, 10b, 10c, 10d, respectively, at a first end 12 of the individual cables 16. A second end 18 of the individual cables 16 in each of the bundles 14a, 14b, 14c, 14d is positioned a set distance from the upper surface of a moving web 22 having ink, dye or other coating 24 with a photo initiator therein. As shown in FIG. 5, the second end 18 of the cables 16 may be arranged in a generally linear or straight line pattern 20 extending perpendicularly to the direction of travel of the web 22. However, the cables 16 of an individual bundle 14a, 14b, 14c, 14d are arranged to extend over only a portion of the width of the web so that all of the cables 16 from all the bundles 14a, 14b, 14c, 14d in combination extend substantially the entire width of the web 22 or at least cover the portion of the web 22 having the ink 24 thereon.

As shown in FIG. 5, the cables 16 of each bundle form a continuous portion of the pattern 20 of cables. However, it will be readily understood that the cables 16 from a single bundle may be intermixed with the cables 16 of another bundle to form the pattern 20. One advantage of the embodiment shown in FIG. 5 is that the individual light sources 10a, 10b, 10c, 10d can be tuned to selected wavelengths, or for that matter, not used at all dependent upon the particular ink configuration and wavelength required to initiate photo polymerization for the ink 24 on that particular portion of the web 22. Moreover, the cables 16 connected to a specific light source may be arranged parallel to a leading or trailing position relative to the cables 16 extending from another light source so that the same portion of the web 22 may be exposed to light from one or more source.

Preferably, a protective window 26 is positioned between the second ends 18 of the cables 16 and the web 22 to protect the cables 16 from splattered ink 24 or other foreign contaminates. Once again, the protective window 26 is preferably quarts or another material transparent to light of the appropriate wavelengths.

From the above disclosure of the general principles of the present invention and the preceding detailed description of a preferred embodiment, those skilled in the art will readily comprehend the various modifications to which this invention is susceptible. Therefore, we desire to be limited only by the scope of the following claims and equivalents thereof.

We claim:

1. A system for curing ink on a moving web in which the ink includes a photo initiator responsive to a light source having a wavelength between 190 nanometers and 1,100 nanometers, the system comprising:
   a light source to selectively generate a monochromatic source of light having a wavelength between 190 nanometers and 1,100 nanometers;
   a bundle of a plurality of fused quartz fiber optic cables for transmitting the light generated by the light source, a first end of each of the fiber optic cables being connected to the light source, a second end of each of the fiber optic cables being spaced a set distance from the web, the second ends of the fiber optic cables being arranged in a pattern to project the light onto the web; and
   a quartz protective window positioned between the second ends of the fiber optic cables and the web, the protective window being removably positioned a fixed distance from the web.

2. The system of claim 1 wherein the pattern is a generally straight line extending across at least a portion of the web perpendicularly with respect to the direction of travel of the web.

3. The system of claim 1 wherein the pattern comprises a plurality of generally linear rows in which each row extends across at least a portion of the web perpendicularly with respect to the direction of travel of the web.

4. The system of claim 1 in which the second ends of the fiber optic cables are fixed relative to the web and a projection of the light from the second ends of the fiber optic cables fixed relative to the web.

5. The system of claim 1 further comprising:
   a generally planar substrate underlying the moving web, a region of the substrate proximate the second ends of the fiber optic cables being generally parallel with the second ends of the fiber optic cables and the protective window being generally planar.

6. The system of claim 1 further comprising:
   a generally cylindrical rotating substrate underlying the moving web in which the pattern of the second ends of the fiber optic cables is generally parallel to an outer circumference of the cylindrical substrate and the protective window is curved.

7. A system for curing ink on a moving web in which the ink includes a photo initiator responsive to a light source having a wavelength between 190 nm and 1,100 nm, the system comprising:
   a plurality of lasers in which each of the lasers selectively generates a source of laser light having a wavelength between 190 nm and 1,100 nm;
   a plurality of bundles of a plurality of fused quartz fiber optic cables for transmitting the light generated by the lasers, a first end of each of the fiber optic cables in each of the bundles being connected to one of the lasers, a second end of each of the fiber optic cables of each of the bundles being spaced a set distance from the web, the second ends of the fiber optic cables of all of the bundles being arranged in a pattern to project the laser light from the lasers onto the web; and
   a protective quartz window positioned between the second ends of the fiber optic cables and the web, the protective window being removably positioned a fixed distance from the web.

8. The system of claim 7 wherein the pattern extends across at least a portion of the web perpendicularly with respect to the direction of travel of the web and the second ends of the fiber optic cables from each of the bundles form only a portion of the pattern across a width of the web and each of the plurality of lasers generates laser light of a different wavelength from the other lasers.

9. A system for curing material containing a photo initiator, the system comprising:
   a web upon which the material containing the photo initiator has been applied;

a light source; and a plurality of fiber optic cables operatively coupled at a first end to the light source to transmit the light to the web for activating the photo initiator and curing the material on the web.

10. The system of claim 9 wherein the web is a moving web.

11. The system of claim 9 wherein the plurality of fiber optic cables each have a second end from which the light is projected onto the web, the second ends of the fiber optic cables being fixed relative to the web.

12. The system of claim 11 wherein the second ends of the fiber optic cables are arranged in a pattern which projects the light to substantially cover an entire dimension of the web.

13. The system of claim 12 wherein the web is a moving web and the light is projected to substantially cover a width dimension of the moving web generally perpendicular to the direction of travel of the moving web.

14. The system of claim 9 further comprising:

a substrate upon which the web is supported.

15. The system of claim 14 wherein the web is moving and the fiber optic cables each have a second end from which the light is projected onto the moving web and the second ends of the fiber optic cables are fixed relative to the moving web.

16. The system of claim 14 wherein the substrate is non-planar.

17. The system of claim 12 wherein the pattern is non-linear.

18. The system of claim 9 further comprising:

a second end on each of the fiber optic cables from which the light is projected onto the web; and a protective shield positioned between the second end of each fiber optic cable and the web and through which the light is projected from the fiber optic cables onto the web.

19. The system of claim 18 wherein the protective shield is a unitary window which covers all of the second ends of the fiber optic cables.

20. The system of claim 9 further comprising a plurality of light sources each generating light of a different wavelength and each being operatively coupled to a plurality of distinct cables for transmitting the light to the web.

21. The system of claim 9 wherein the light source is selectively adjustable to generate a plurality of wavelengths of light.

22. The system of claim 9 wherein the light source is monochromatic.

23. A system for curing material containing a photo initiator, the system comprising:

a moving web upon which the material containing the photo initiator has been applied;

a substrate upon which the web is supported;

a monochromatic light source;

a plurality of fiber optic cables operatively coupled at a first end to the light source, each of the fiber optic cables having a second end from which the light is projected onto the web for activating the photo initiator and curing the material on the web, the second ends of the fiber optic cables being fixed relative to the web;

wherein the second ends of the fiber optic cables are arranged in a pattern which projects the light to substantially cover a width dimension of the moving web generally perpendicular to the direction of travel of the moving web; and a protective shield positioned between the second end of each fiber optic cable and the web and through which the light is projected from the fiber optic cables onto the web.

24. The system of claim 23 wherein the substrate is non-planar.

25. The system of claim 23 wherein the pattern is non-linear.

26. The system of claim 23 further comprising a plurality of light sources each generating light of a different wavelength and each being operatively coupled to a plurality of distinct cables for transmitting the light to the web.

27. The system of claim 23 wherein the light source is selectively adjustable to generate one of a plurality of wavelengths of light.

28. A light delivery system for transmitting light from a light source to a web having a material thereon containing a photo initiator, the light delivery system comprising:

a plurality of fiber optic cables operatively coupled at a first end to the light source, each of the fiber optic cables having a second end from which the light is projected onto the web for activating the photo initiator and curing the material on the web, the second ends of the fiber optic cables being fixed relative to the web;

wherein the second ends of the fiber optic cables are arranged in a pattern which projects the light to substantially cover a dimension of the web;

a protective shield positioned between the second end of each fiber optic cable and the web and through which the light is projected from the fiber optic cables onto the web.

29. The light delivery system of claim 28 wherein the pattern is non-linear.

30. The light delivery system of claim 28 wherein the pattern is non-planar.

31. The light delivery system of claim 28 further comprising a plurality of light sources each generating light of a different wavelength and each being operatively coupled to a plurality of distinct cables for transmitting the light to the web.

32. The light delivery system of claim 28 wherein the protective shield is a unitary window which covers all of the second ends of the fiber optic cables.

33. A method of curing material containing a photo initiator, the method comprising the steps of:

applying the material containing the photo initiator onto a web;

moving the web in a first direction;

operatively coupling a first end of each of a plurality of fiber optic cables to a light source;

arranging a second end of each of the fiber optic cables in a fixed pattern relative to the moving web; and projecting light from the light source through the cables and onto the moving web to activate the photo initiator and cure the material on the web, the light being projected to substantially cover a width dimension of the moving web generally perpendicular to the direction of travel of the moving web.

* * * * *